United States Patent [19]

Stanley

[11] Patent Number: 4,727,624
[45] Date of Patent: Mar. 1, 1988

[54] FOOD CASING PRESIZING DEVICE

[75] Inventor: Thomas R. Stanley, Downers Grove, Ill.

[73] Assignee: Teepak, Inc., Oak Brook, Ill.

[21] Appl. No.: 921,978

[22] Filed: Oct. 22, 1986

[51] Int. Cl.4 .............................................. A22C 11/02
[52] U.S. Cl. .............................................. 17/41; 17/49
[58] Field of Search ............... 17/41, 42, 1 R, 35, 17/49

[56] References Cited

U.S. PATENT DOCUMENTS

| 3,457,588 | 7/1969 | Myles et al. | 17/41 |
| 3,553,769 | 1/1971 | Myles et al. | 17/49 |
| 4,034,441 | 7/1977 | Kupcikevicius et al. | 17/41 |
| 4,077,090 | 3/1978 | Frey et al. | 17/41 |
| 4,164,057 | 8/1979 | Frey et al. | 17/49 |
| 4,202,075 | 5/1980 | Michel et al. | 17/41 |
| 4,335,488 | 6/1982 | Becker | 17/33 |
| 4,512,059 | 4/1985 | Beckman | 17/45 |
| 4,528,719 | 7/1985 | Frey | 17/49 |
| 4,535,508 | 8/1985 | Aceto | 17/49 |

Primary Examiner—Willie G. Abercrombie
Attorney, Agent, or Firm—Howard M. Ellis; Michael L. Dunn

[57] ABSTRACT

A sizing ring for stretching tubular food casing drawn from a stuffing horn has expandable fingers which can be spontaneously adjusted during filling operations for fine tuning the diameter of casings for greater dimensional uniformity of stuffed food casings.

12 Claims, 4 Drawing Figures

FOOD CASING PRESIZING DEVICE

BACKGROUND OF THE INVENTION

The present invention relates generally to new and useful devices and methods of packaging food products, and more specifically, to improved adjustable food casing sizing devices and methods of stuffing food products in tubular casings.

In the manufacture of sausage products, a tubular food casing, such as nonedible cellulose is loaded onto a stuffing horn of a filling machine and stuffed with an emulsion, usually comprised of comminuted meat together with fillers, seasonings, spices, etc. In the case of small sausage products, like frankfurters the filled casings are twisted, tied or clipped into suitable links at predetermined intervals and further processed. For larger sausage products, like bolognas, salamis, and the like the meat emulsion is introduced into larger, heavier walled fibrous type casings and formed into chubs or lengthy individual sausage sticks.

In preparing large diameter sausage products, like bologna, an important consideration is the maintenance of accurate size control over the entire length of the sausage stick. It is particularly important that the diameter of the large sausage products be controlled carefully so that meat packers are able to cut the sausage into slices of predetermined thickness and diameter for prepackaging. The objective is to have a given number of slices weigh precisely a predetermined amount for each package.

In stuffing larger sausage products, however, there is some tendency for diameter variations to occur which may be due to varying stretch properties of casings and meat emulsion charging pressures. There may be less variation in product diameter with sausage stuffed in fibrous casings than nonreinforced type casings. Nevertheless, meat processors are constantly striving to improve operations that affect finished package yields. Constant control during stuffing of green stick diameter assures more uniform slice weight and minimizes package over and under weight variations.

To achieve greater dimensional uniformity in stuffing larger food casings, sizing devices have been used. Diametrical stretching of the casing is performed by longitudinally passing the tubular casing prior to filling, in most instances over a stationary type sizing device which operates to stretch the casing to the stuffed diameter recommended by the manufacturer. In addition to the stretching action of the sizing device, casing moving over some devices generates friction. This creates drag or holdback forces on the casing increasing the diameter of the filled casing and vice versa depending on the extent of the forces being exerted.

While diametrical sizing and holdback are desirable to provide fully stuffed food products of dimensional uniformity, fine adjustments either increasing or decreasing the outside diameter of a sizing device may become necessary during stuffing for optimal sizing performance. As previously indicated, variations in product diameter occur during stuffing cycles, for example, as a result of variations in stretch characteristics in a given batch of casing.

U.S. Pat. Nos. 3,457,588 and 3,553,769 provide an adjustable sizing device with a plurality of sizing elements which can be radially displaced relative to the stuffing horn by turning multiple connecting shafts. The sizing device, including connecting shafts are fixedly connected to the stuffing horn, and is designed to accommodate individual lengths of unshirred tubular casing. U.S. Pat. No. 4,202,075 also employs a means for adjusting the displacement of a sizing device which is formed from a tubular core. Adjustments in the displacement of the expanded portion of the tubular core cannot be made automatically during the stuffing cycle.

U.S. Pat. No. 4,535,508 discloses an expandable casing sizing mechanism with outwardly displacable sizing members for engaging the casing when the device is mounted onto the stuffing horn. The casing sizing device is nonadjustable. Like U.S. Pat. No. 4,535,508, U.S. Pat. No. 4,512,059 has rigid petal-like sizing members which become outwardly expanded against the inner surface of the casing. The force for moving the petals is supplied by the casing itself. U.S. Pat. No. 4,528,719 comprises a two-piece sizing ring. Expansion of the casing sizing engaging elements is achieved by compressing one element inside the other.

U.S. Pat. Nos. 4,077,090 and 4,164,057 disclose a combination sizing disc and snubbing ring assembly. The sizing disc is mounted on a slidable sleeve on the stuffing horn and moves reciprocally, engaging the snubbing ring to form a braking surface for regulating the frictional forces developed to effect braking action and casing holdback. As in the case of most of the foregoing sizing ring assemblies, the disclosures of U.S. Pat. Nos. 4,077,090 and 4,164,057 do not suggest means for adjusting ring diameter during stuffing operations. Accordingly, there is a need for an improved food casing sizing device which will offer greater flexibility in making spontaneous adjustments for "fine tuning" ring diameter and diametrical tension being applied to casings during stuffing operations.

BRIEF DESCRIPTION OF THE INVENTION

The present invention provides for a sizing ring having means for adjusting its stretching diameter during stuffing operations for forming food casing with the desired uniform diametrical size prior to filling. The sizing ring comprises a mounting bracket for connecting to the stuffing horn of a filling machine, stretching members for diametrically engaging and stretching food casing for the stuffing horn to a predetermined diameter, and a support wall for the stretching members extending radially from the mounting bracket. The support wall includes moveable members for expanding and relaxing or contracting the stretching members for engaging and stretching the tubular casing as the interior wall of the casing is drawn over the ring immediately before being filled.

In addition to providing for improved sizing rings, the present invention also includes casing articles where the sizing rings are furnished with shirred lengths of tubular food casing. In this embodiment, the sizing ring is implanted into the unshirred end of a shirred strand of food casing and the end of the casing closed over the sizing ring. The casing article including the sizing ring can be loaded onto the stuffing horn as a unit.

The present invention also includes methods of stuffing food casing comprising the steps of inserting a strand of tubular food casing on a stuffing horn, mounting the sizing ring as disclosed herein onto the stuffing horn. Food is pumped into the casing having a closed end on the stuffing horn. As the casing is withdrawn from the horn during filling, it is diametrically stretched to a predetermined diameter by passing the internal wall of the casing over the stretching members of the sizing ring.

In a further aspect, the invention contemplates a food stuffing apparatus comprising a stuffing horn with means for engaging the sizing ring. The stuffing apparatus also includes motor and transmission means for actuating the moveable members for "fine tuning" and stretching of the tubular food casing during filling operations.

DESCRIPTION OF THE DRAWINGS

For a further understanding of the invention as well as its characterizing features, reference should now be made to the following detailed description thereof taken in conjunction with the accompanying drawings, wherein.

DETAILED DESCRIPTION OF THE INVENTION

Figure 1:
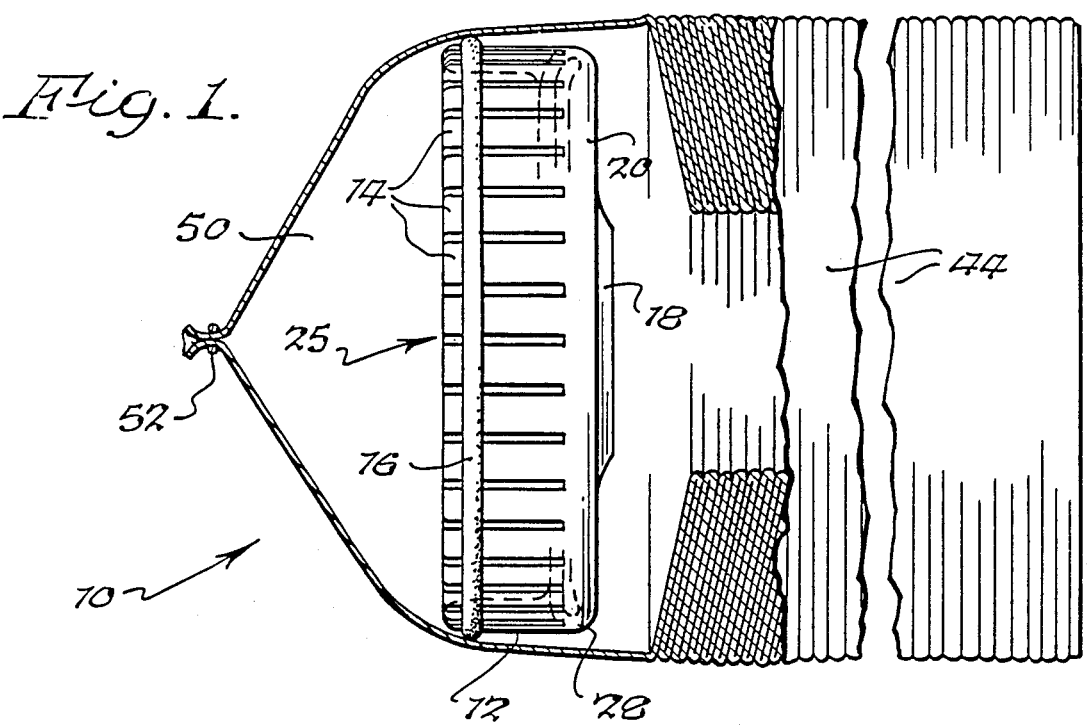
FIG. 1 is a side elevational view of the sizing device as an element of a unitized casing article with a section of the casing removed.

Turning first to FIG. 1, there is shown a unitized food casing article 10 comprised of a sizing ring 25 packaged in one end of a shirred strand 44. The terminal pleats of strand 44 are deshirred forming a pocket 50 for the sizing ring. After insertion of sizing ring 25 into the deshirred end of the casing, which casing has a diameter sufficient to accommodate the ring when fingers 14 of outer rim 12 are relaxed in an unflexed position, the terminal portion of the food casing is gathered and an end closure clip 52 applied.

Casing articles 10 comprised typically of fibrous casing formed of regenerated cellulose or other nonedible materials, are packaged in caddies for shipment to food processors for stuffing. The articles prior to packaging can be prepared with premoistened, ready-to-stuff casing which eliminates the need for a further moistening step prior to stuffing. Alternatively, the casing article can be prepared at lower moisture content, e.g. 10-13% based on total casing weight in which instance the casing article can be soaked in water by food processors prior to loading onto the stuffing horn for filling.

Figure 2:
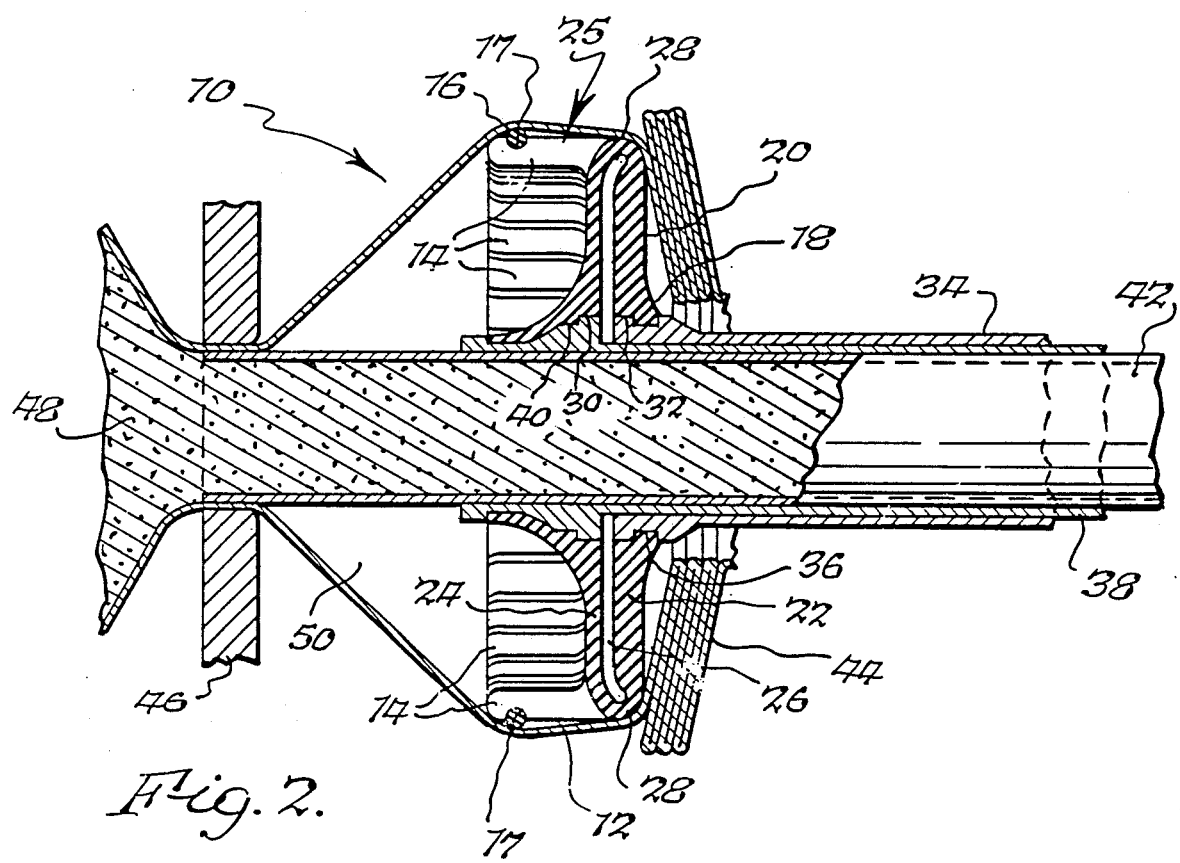
FIG. 2 is a side sectional view of the sizing device in resting position connected to a stuffing horn during filling.
Figure 3:
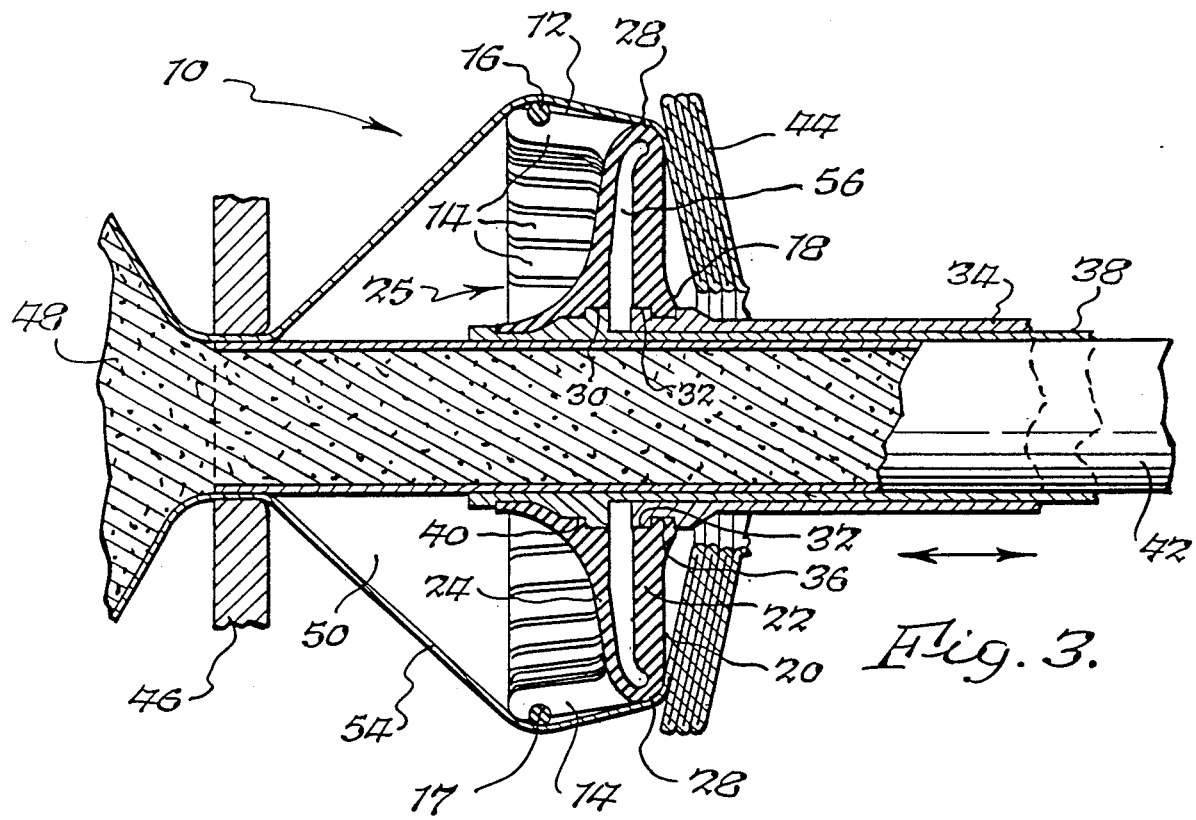
FIG. 3 is a side sectional view of the sizing device in a flexed position connected to a stuffing horn during filling.

The sizing ring is comprised of a central retaining ring 18 for connecting the device coaxially to stuffing horn 42 (FIG. 2). Outer rim 12 of sizing ring 25 engages the inner wall of the casing diametrically stretching it. Outer rim 12 is comprised of multiple resilient fingers 14 running parallel with the longitudinal axis of the stuffing horn. The rim of the ring is split into multiple fingers for greater flexibility. The flexible fingers 14 are retained in a retracted or relaxed position (FIG. 2) by an encircling resilient O-ring 16 at the outer peripheral edge of the sizing ring seated in a groove 17 which imparts inward pressure on fingers 14. The encircling rubber O-ring 16 also exerts drag or holdback forces on the rate of release of casing 54 drawn from the horn during filling, particularly when the fingers are in a flexed position (FIG. 3).

A wall 20 radially extending from the retaining ring 18 provides support and the means for expanding and relaxing fingers 14, as required. The wall 20 is split into dual sections: a moveable exterior or rear portion 22 and a stationary interior or front portion 24. The outermost section of the bifurcated wall 20 where the exterior and interior wall portions 22 and 24 respectively join forms a pivot 28 for the radial flexing of fingers 14. The stationary interior wall portion 24 forms the fulcrum of the lever. Thus, withdrawing the exterior wall portion 22 by pulling rearwardly results in slot 26 (FIG. 2) formed by walls 22 ans 24 to widen into slot 56 (FIG. 3) causing a radial flexing of fingers 14 at 360°, and increased diametrical stretching of the sidewall of the casing 54 as it is drawn over the rim of the sizing ring. Preferably, the exterior wall portion 22 is thick relative to the interior wall portion 24, as best illustrated by FIGS. 2 and 3.

In mounting the sizing ring to the stuffing horn such that the interior wall portion is held stationary while the exterior wall portion is moveable for flexing rearwardly for adjusting the outward tension of fingers 14, the retaining ring 18 has a dual snap ring connection. That is to say, the sizing ring has forward locking grooves 30 at the inner edge of the interior wall portion 24 and rearward locking grooves 32 at the inner edge of the exterior wall portion 22. The forward locking grooves 30 snap connect with interconnecting land 40 of stationary tube 38. Tube 38 is shown as an inner sleeve member concentrically fitting over stuffing horn 42. Although tube 38 is shown as a lengthy sleeve, it is to be understood that a narrow ring with snap lock fittings can be used in place thereof.

Figure 4:
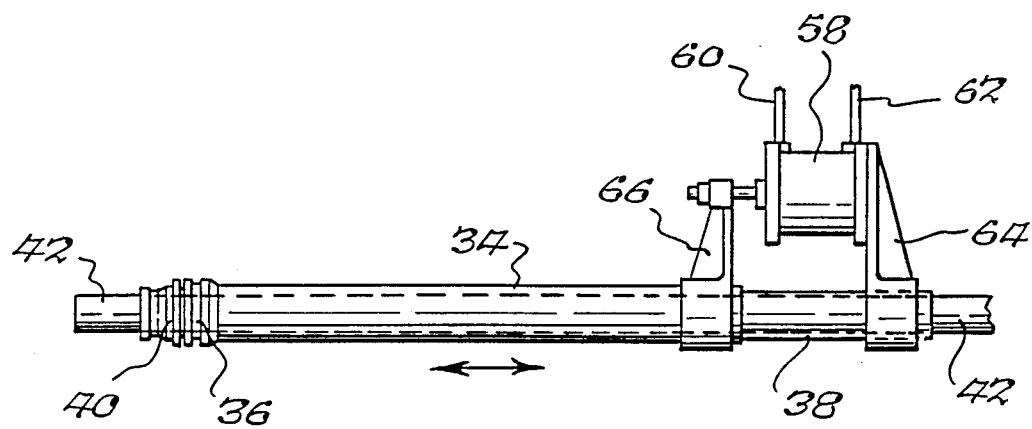
FIG. 4 is a side view of a stuffing horn with the sizing ring and food casing removed showing the mechanism for connecting and actuating the sizing ring.

The rearward locking grooves 32 of the flexing exterior wall 22 connect with locking groove 36 of the outer concentric sleeve 34. Sleeve 34 operates as an axially moveable drive member over stationary sleeve 38 for transmitting energy to widen or narrow the gap between the bifurcated walls for increasing the decreasing the tension on the casing during filling. Fluid motor means 58 (FIG. 4) with fluid lines 60 and 62 mounted upstream of the sizing ring at the inlet end of the stuffing horn supported by motor mount 64 provides the mechanical energy for adjusting sizing ring expansion through drive connector 66 and sleeve 34.

The sizing ring device of the present invention may be fabricated from approved plastics, such as polyolefins like higher density polyethylene, polypropylene, and the like. Such materials are especially preferred for making low cost disposable rings.

The present invention also contemplates the optional use of brake 46 of conventional design for regulating filled casing dimension and the rate of release of casing from the stuffing horn 42 as emulsion 48 is charged thereto.

In operation of the casing presizer device described herein, a shirred strand of food casing is first inserted onto the stuffing horn. The leading end of the shirred strand nearest the horn outlet has the sizing ring inserted into a pocket formed from deshirred film which is locked into place on the stuffing horn. As emulsion is pumped into the casing, motor 58 is actuated to draw sleeve 34 slightly upstream causing an increase in radial tension in fingers 14 and further diametrical stretching of the casing. Radial tension during stuffing operations may be increased or decreased for fine tuning product diameter by operation of motor 58.

Although the invention has been described in considerable detail with respect to the preferred embodiments thereof, it will be apparent that the invention is capable of numerous modifications and variations to those skilled in the art without departing from the spirit and scope of the invention, as defined in the appended claims.

I claim:

1. A sizing ring for food casing, comprising means for mounting said ring onto a stuffing horn, means for diametrically engaging and stretching the food casing from a length of casing on the stuffing horn, and a continuous, bifurcated wall means extending radially from the mounting means for supporting said means for engaging and stretching the casing, said bifurcated wall means including moveable means for expanding and relaxing said means for engaging and stretching the casing.

2. The sizing ring of claim 1 wherein said means for engaging and stretching the casing comprises radially expandable fingers forming a rim at the outer perimeter of the bifurcated wall means.

3. The sizing ring of claim 2 including means for separating and contracting a section of the bifurcated wall means.

4. The sizing ring of claim 2 wherein the bifurcated wall means comprises an interior wall section and an exterior wall section, said exterior wall section being thick relative to said interior wall section.

5. The sizing ring of claim 4 including means for separting and contracting the exterior wall section relative to the interior wall section.

6. The sizing ring of claim 5 wherein the means for separating and contracting the exterior wall section comprises an axially moveable sleeve on the stuffing horn.

7. The sizing ring of claim 5 including separable mounting means for the exterior wall section.

8. A shirred strand of tubular food casing in combination with the sizing ring of claim 1.

9. A shirred strand of tubular food casing in combination with the sizing ring of claim 2.

10. A shirred strand of tubular food casing in combination with the sizing ring of claim 4.

11. A food stuffing apparatus comprising a stuffing horn and means for engaging the sizing ring of claim 1, said stuffing apparatus including motor means for actuating the moveable means of said bifurcated wall means for expanding and relaxing the casing engaging and stretching means.

12. A food stuffing apparatus comprising a stuffing horn and means for engaging the sizing ring of claim 4, said stuffing apparatus including motor means for actuating the exterior wall section of the bifurcated wall for expanding and relaxing the sizing ring fingers.

* * * * *